(12) United States Patent
Kasravi et al.

(10) Patent No.: US 7,580,947 B2
(45) Date of Patent: Aug. 25, 2009

(54) DATA REPRESENTATION FOR IMPROVED LINK ANALYSIS

(75) Inventors: Kas Kasravi, W. Bloomfiled, MI (US); Maureen Lawson, Royal Oak, MI (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1429 days.

(21) Appl. No.: 10/401,104

(22) Filed: Mar. 27, 2003

(65) Prior Publication Data

US 2004/0193514 A1 Sep. 30, 2004

(51) Int. Cl.
*G06F 7/00* (2006.01)
(52) U.S. Cl. .................................. 707/103 R; 707/102
(58) Field of Classification Search ........................ None
See application file for complete search history.

(56) References Cited

U.S. PATENT DOCUMENTS

| 4,868,733 | A | | 9/1989 | Fujisawa et al. | ............. 364/200 |
|---|---|---|---|---|---|
| 5,878,406 | A | | 3/1999 | Noyes | .......................... 706/55 |
| 5,999,940 | A | | 12/1999 | Ranger | ....................... 707/103 |
| 6,112,209 | A | * | 8/2000 | Gusack | ........................ 707/101 |
| 6,487,556 | B1 | * | 11/2002 | Downs et al. | ................ 707/101 |
| 2002/0091696 | A1 | | 7/2002 | Craft et al. | ..................... 707/10 |
| 2003/0018616 | A1 | * | 1/2003 | Wilbanks et al. | ................ 707/2 |

FOREIGN PATENT DOCUMENTS

| WO | WO 99/34307 | 7/1999 |
|---|---|---|
| WO | WO 00/29980 | 5/2000 |
| WO | WO 02/063502 | 8/2002 |

OTHER PUBLICATIONS

PCT Notification Concerning Transmittal of Copy of International Preliminary Report on Patentability, PCT/US2004/009079, Dec. 6, 2007, 9 pages.
PCT International Search Report, PCT/US2004/009079, Oct. 27, 2004, pp. 5.
Pietro Cerveri, Marco Masseroli, Francesco Pinciroli, Luisa Portoni, and Laura Vizzotto, "Anatomical Knowledge Representation: Attempting Querying Integration on VHD via UMLS," Oct. 5, 2000, National Library of Medicine, XP-002299881, pp. 1-16.

(Continued)

*Primary Examiner*—Shahid A Alam
*Assistant Examiner*—Thu-Nguyet Le

(57) ABSTRACT

Systems and techniques for facilitating link analysis may be implemented by creating a data structure that includes a flexible and optimal representation of data for use in performing link analysis. The data structure may be used for storing data relating to a knowledge domain, and the data may include generic nodes, node instances, generic links, and link instances. Each generic node may define properties of potential node instances. Each node instance may be based on a corresponding generic node and may represent an entity in the knowledge domain. Each generic link may define properties and/or functions of potential link instances. Each link instance may be based on a corresponding generic link and may represent a relationship between node instances. The data may be stored in tables in a database and may be analyzed by performing a link-by-link search to infer new knowledge about relationships among entities in the knowledge domain.

23 Claims, 5 Drawing Sheets

OTHER PUBLICATIONS

Richard Lee, "Automatic Information Extraction from Documents: A Tool for Intelligence and Law Enforcement Analysts," Oct. 23, 1998, XP-002299882, pp. 63-67.

Robert Ayres, "The Functional Data Model as the Basis for an Enriched Database Query Language," Mar. 1999, Journal of Intelligent Information Systems, vol. 12, pp. 139-164.

A Delphi Group White Paper, "Taxonomy & Content Classification," Nov. 4, 2002, XP-002299884, pp. 1-60.

Amit Sheth, Clemens Bertram, David Avant, Brian Hammond, Krysztof Kochut, and Yashodhan Warke, "Managing Semantic Content for the Web," Jul.-Aug. 2002, XP-001130966, pp. 80-87.

International Search Report, PCT/US2004/009077, Nov. 8, 2004, pp. 1-5.

M. P. Papazoglou, "Unraveling the Semantics of Conceptual Schemas," Sep. 1, 1995, Communications of the ACM, vol. 38, No. 9, XP000558793, pp. 80-94.

Robert L. Griffith, "Three Principles of Representation for Semantic Networks," Sep. 3, 1982, ACM Transactions on Database Systems, vol. 7, No. 3, XP002301967, pp. 417-442.

John L. Schnase, John J. Leggett, David L. Hicks, and Ron L. Szabo, "Semantic Data Modeling of Hypermedia Associations," Jan. 1993, ACM Transactions on Information Systems, vol. 11, No. 1, XP002301968, pp. 27-50.

M. Azmoodeh, "BRMQ: A Database Interface Facility based on Graph Traversals and Extended Relationships on Group of Entities," Feb. 1, 1990, The Computer Journal, vol. 33, No. 1, XP000140529, pp. 31-39.

Roger D. Horn, J. Douglas Birdwell, and Leonard W. Leedy, "Link Discovery Tool," Aug. 18, 1997, ONDCP/CTAC International Symposium, XP002301969, pp. 1-5.

Stanley Y. W. Su, Shirish Puranik, and Herman Lam, "Heuristic Algorithms for Path Determination in a Semantic Network," 1990, Computer Software and Applications, XP010019773, pp. 587-592.

Hsinchun Chen, Roslin V. Hauck, Homa Atabakhsh, Harsh Gupta, Chris Boarman, Jennifer Schroeder, and Linda Ridgeway, "COPLINK: Information and Knowledge Management for Law Enforcement," Nov. 5, 2000, Proceedings of SPIE, vol. 4232, XP002301970, pp. 293-304.

Donovan Hsieh, "A Logic to Unify Semantic Network Knowledge Systems with Object-Oriented Database Models," Jan. 7, 1992, System Sciences, XP010025898, pp. 347-358.

\* cited by examiner

DATA REPRESENTATION FOR IMPROVED LINK ANALYSIS

TECHNICAL FIELD

This description relates to data storage models, and more particularly to optimal and flexible modeling of data for link analysis applications.

BACKGROUND

In link analysis, data sets may be represented as collections of linked entities, and the topology and connections among the various entities can be analyzed to uncover valuable information. Each entity may symbolize a real world object, such as a person, place, physical object, business unit, phone number, and the like, and each connection between entities may represent an association or relationship between the entities. In general, entities may be represented as nodes and connections may be represented as links. Using this type of data representation, a document collection may be represented as documents connected by citations and hypertext links. As another example, an organization may be represented as individuals that are associated according to reporting assignments, social relationships, and communication patterns.

Link analysis may be "visual" or "algorithmic." Visual link analysis presents an image of the entities and their connections to an analyst who may use the image to discover relationships or otherwise infer new information. Algorithmic link analysis involves a more sophisticated and deeper analysis of the linked entities, such as the distance between two nodes and/or whether two nodes are related through a third node. By at least partially automating the process, algorithmic link analysis process, the process may facilitate a more efficient evaluation of connections and relationships among entities.

Applications of link analysis are typically investigative in nature. For example, terrorist investigations have increasingly involved a study of the relationships among people, common residences, banks, fund transfers, and known terrorist organizations. Link analysis may also be used in other law enforcement or fraud detection efforts to identify associations among individuals and organizations; in epidemiology to discover connections between people, animals, homes, and workplaces; in evaluating complex computer systems; and in information retrieval to analyze relationships among web pages, news stories, or other document collections. Accordingly, link analysis is potentially valuable to a wide variety of enterprises, including, for example, organizations involved with business intelligence and knowledge management.

In performing link analysis, one must first develop a topology (e.g., known links between people, things, and events). The topology may be constructed using multiple, heterogeneous data sources. The value of link analysis is in using the topology to predict and infer previously unknown relationships among entities. Such predictions and inferences may be made, for example, by looking at the distance (e.g., the number of links) between entities, a connection between two entities through a third entity, or a pattern of events. For example, by examining a set of activities, it may be possible to discover a relationship between entities or to predict an upcoming event.

Currently, link analysis is being explored primarily at the research level. While there are some link analysis software products available, such products are typically custom-built applications and/or have very minimal capabilities. Many such products provide only visual tools. Thus, there are opportunities for advances in the field of link analysis, such as improved performance, better knowledge representation, faster searching capabilities, better discovery techniques, and the like.

SUMMARY

Techniques for representing data for use in link analysis applications may be implemented to provide optimal and flexible representations of data that intuitively incorporate the notion of connections among entities. Conventional techniques for representing data may be inadequate for effectively performing link analysis. For example, traditional relational or object models may fail to fully comprehend the connections among entities, and may lead to less efficient searching processes, unintuitive data representations, and extensive data retrieval. Furthermore, business databases are typically constructed according to a data model that corresponds to certain business processes. Casual changes to such a database cannot be made simply to optimize a database for link analysis; instead, changes to the data model generally require much deliberation and study. For these reasons, a large-scale link analysis application may require a more flexible and optimal data representation. Accordingly, techniques are provided for using a set of tables in a database to capture the entire domain knowledge. In one implementation, a set of tables may be used to capture the domain taxonomy of nodes and links, all instances of the nodes and links, source data for the instances, and temporal data for the instances.

In one general aspect, link analysis may be facilitated through use of one or more databases for storing data relating to a knowledge domain and a taxonomy management utility for managing the data stored in the one or more databases. The data may include generic nodes, node instances, generic links, and links instances. Each generic node may define properties of a node that can be instantiated in the knowledge domain. Each node instance may correspond to one of the generic nodes and may represent an entity in the knowledge domain. Each generic link may define properties and/or functions of a link that can be instantiated in the knowledge domain. Each link instance may correspond to one of the generic links and may represent a relationship between specified node instances.

Implementations may include one or more of the following features. For example, the taxonomy management utility may include a set of rules that govern a construction of the generic nodes and the generic links and/or rules for maintaining the uniqueness of the generic nodes and the generic links. The taxonomy management utility may include rules defining one or more hierarchies of generic nodes for use in maintaining uniqueness of node instances. The one or more databases may include a node taxonomy table for storing the generic nodes, a node table for storing the node instances, a link taxonomy table for storing the generic links, and a link table for storing the link instances. Each node instance may include a pointer to the corresponding generic node, and each link instance may include a pointer to the corresponding generic link. The system may include a source table for storing data source information and a temporal table for storing temporal information. Each node instance and each link instance may include a pointer to an entry in the source table and a pointer to an entry in the temporal table.

An extraction utility may be employed to extract node and link data from a data source and store the node and link data in the one or more databases.

The node instances and the link instances in the one or more databases may be analyzed to infer new knowledge. The link analysis may include searching through the knowledge domain. Each entity may be a person, enterprise, object, attribute, characteristic, or property.

Each generic node may be identified from a collection of generic nodes having properties that correspond to the entity, and a node instance corresponding to the identified generic node may be created for each entity. For each relationship, a generic link may be identified from a collection of generic links having properties and/or functions that correspond to the relationship, and a link instance corresponding to the identified generic link may be created for each relationship.

A determination may be made that the collection of generic nodes does not include a generic node for a particular entity, and a new generic node having properties that correspond to the particular entity may be generated. A node instance may be created from the new generic node for the particular entity. A determination may be made that the collection of generic links does not include a generic link for a particular relationship, and a new generic link having properties and/or functions that correspond to the particular relationship may be generated. A link instance may be created from the new generic link for the particular relationship. A determination may be made whether a node instance already exists for a particular entity using a node hierarchy, and different levels of the node hierarchy may represent entities with different degrees of specificity. Based on this determination, it may be possible to avoid creating multiple node instances for the particular entity.

The described techniques may be implemented, for example, in a system for facilitating link analysis, by a machine-readable medium that stores instructions operable to cause one or more machines to perform certain operations, or in a method for generating a data structure for use in link analysis.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Systems and techniques may be provided for capturing knowledge of an entire domain by storing information in a multi-table database. Essentially, the entire domain may be modeled by nodes and links.

A node is defined as any entity in the domain (e.g., a person, place, company, or vehicle) and a link is defined as any relationship between the two nodes (e.g., ownership, employee, sibling, and the like). Nodes do not necessarily need to represent actual physical objects. For example, nodes may also represent characteristics or properties (e.g., a name, phone number, account number, or identification number associated with a person or company).

In accordance with the described systems and techniques, and unlike traditional relational database models, the addition of new data and new modeling or analysis schema to the multi-table database does not require the creation of new tables. In one implementation, multiple tables may be used to store the universe of possible node and link objects, node and link instances that are respectively created from the node and link objects, source data, and temporal data. Any new data is defined using additional entries in the taxonomy tables, and is instantiated either as a node or as a link. Instead of or in addition to the source and temporal tables, the described systems and techniques can also be implemented using other types of tables for storing additional or alternative information. For example, the database may include a table for storing location information or any other domain-specific table.

Figure 1:
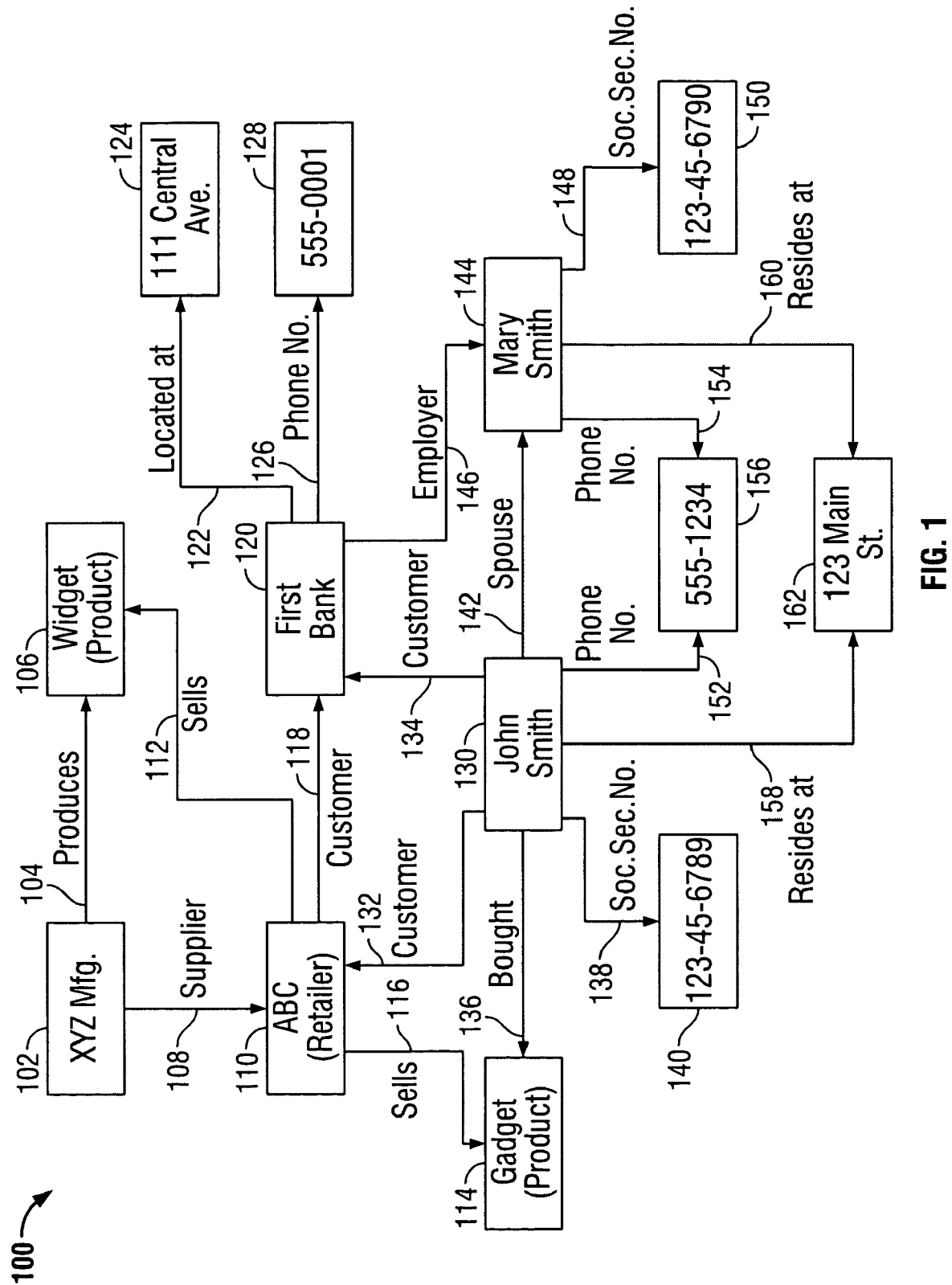
FIG. 1 is an illustrative example of a link diagram.

FIG. 1 is an illustrative example of a link diagram 100. The link diagram 100 is representative of the type of information that may be used in performing link analysis. The link diagram 100 includes a number of nodes that are connected by links. The nodes represent entities (including, in some cases, properties or characteristics) and the links represent relationships among the nodes. In this example, an XYZ Manufacturing node 102 has associated links 104 and 108 indicating, respectively, that XYZ Manufacturing produces a widget product (node 106) and that XYZ Manufacturing is a supplier to retailer ABC (node 110). Retailer ABC sells the widget product (node 106) as indicated by a link 112 and also sells a gadget product (node 114) as indicated by another link 116. A link 118 indicates that retailer ABC (node 110) is a customer of First Bank (node 120). First Bank has a link 122 indicating that it is located at 111 Central Avenue (node 124) and another link 126 indicating that its phone number is "555-0001" (node 128).

A node 130 represents a person named John Smith, and links 132 and 134 indicate that John Smith is a customer of retailer ABC (node 110) and First Bank (node 120), respectively. A link 136 indicates that John Smith bought a gadget product (node 114), and another link 138 indicates that John Smith has a social security number of "123-45-6789" (node 140). Yet another link 142 indicates that John Smith has a spouse named Mary Smith (node 144), who is employed (link 146) by First Bank (node 120) and who has (link 148) a social security number of "123-45-6790" (node 150). Both John Smith (node 130) and Mary Smith (node 144) have a phone number of "555-1234" (node 156), as indicated by links 152 and 154, and reside at 123 Main Street (node 162), as indicated by links 158 and 160.

Although the illustrated link diagram 100 is in the context of a particular type of domain, virtually any type of domain in which relationships exist among items of data can be represented as a link diagram. The links may contain different levels of information than that illustrated. For example, a link may not indicate that the associated information is, e.g., a social security number; instead, the link may merely represent ownership or some one-to-one correspondence between a person and a social security number.

The ultimate purpose of the link diagram, or the information represented in the link diagram, may be to perform some type of link analysis. For example, in the illustrated link diagram, a search of the link diagram 100, or the information represented by the link diagram 100, may reveal that there is a link between a certain address (e.g., 123 Main Street (node 162)) and another item in the domain (e.g., a gadget product (node 114) purchased from retailer ABC (node 110)). Such a search may be performed manually using a visual analysis of the link diagram 100 or using some type of automated or algorithmic analysis, which may be performed using a processor programmed with instructions for performing a search of nodes and links stored in a memory.

Figure 2:
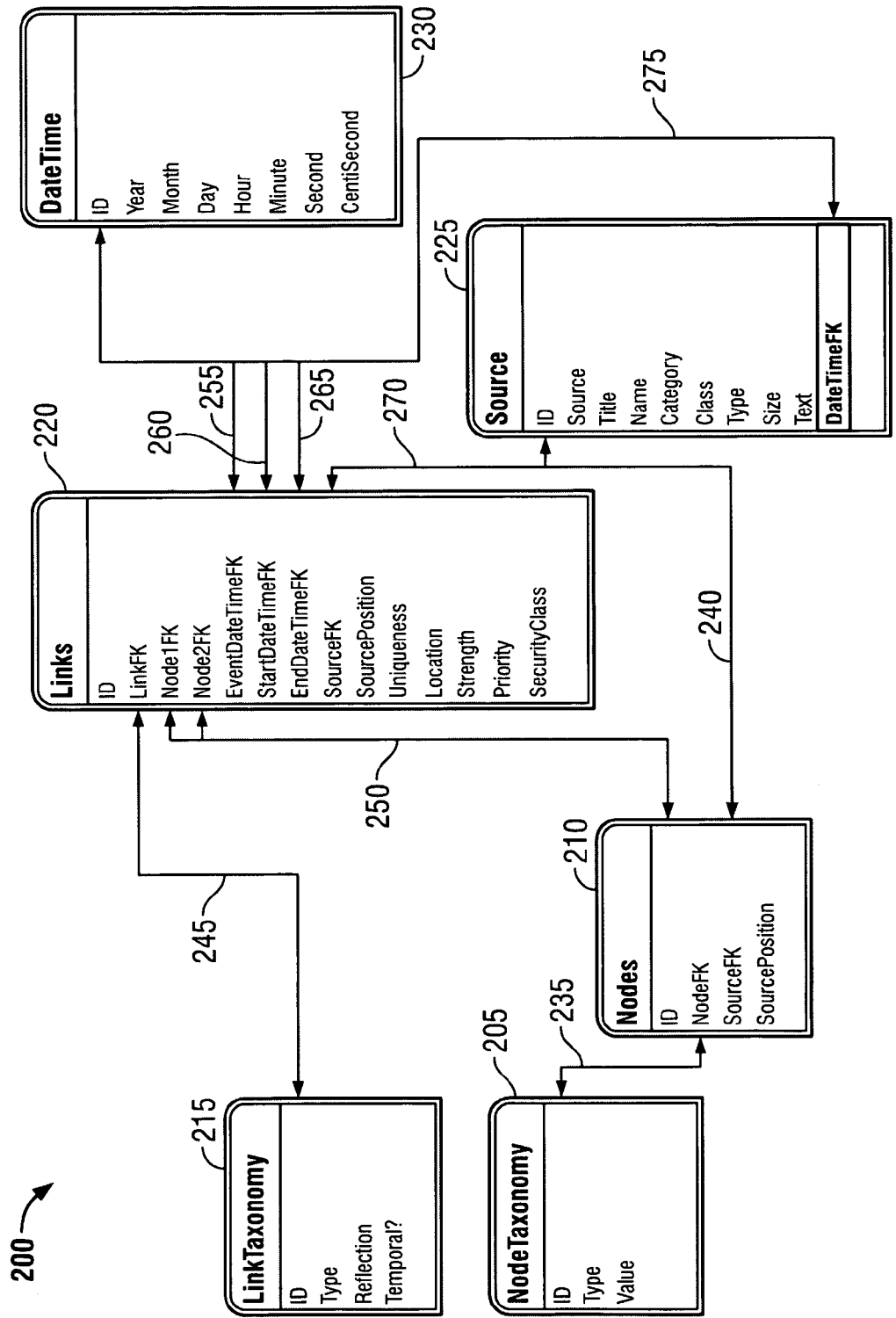
FIG. 2 is a representation of a multi-table model for storing data for use in link analysis.

FIG. 2 is a representation of a multi-table model 200 for storing data for use in link analysis. The tables include a node taxonomy table 205, a nodes table 210, a link taxonomy table 215, a links table 220, a source table 225, and a date and time table 230. The node taxonomy table 205 stores meta data for the nodes. The meta data stored in the node taxonomy table 205 embodies generic building blocks for nodes or entities in a knowledge domain and may include the type and value of new or existing nodes. Essentially, the node taxonomy table 205 contains a list or library of the nodes that may be instantiated in the domain. Each entry in the node taxonomy table 205 is a parent class for new instances of nodes having the identified type and value.

The nodes table 210 stores instances of the nodes in the domain. Each node instance relates to an entry in the node taxonomy table 205 and inherits the properties of the corresponding entry from the node taxonomy table 205. For example, an entry in the node taxonomy table 205 may be of type "first name" and have a value of "John", and one or more instances of the "first name=John" node may be captured in the nodes table 210.

The link taxonomy table 215 stores meta data for the links. The meta data stored in the link taxonomy table 215 embodies generic building blocks for links or relationships in the knowledge domain and may include the type and other properties and/or functions of new or existing links. Essentially, the link taxonomy table 215 contains a list or library of the links that may be instantiated in the domain. Each entry in the link taxonomy table 215 is a parent class for new instances of links having the identified type, properties, and functions.

The links table 220 stores instances of the links in the domain. Each link instance relates to an entry in the link taxonomy table 215 and inherits the properties and functions of the corresponding entry from the link taxonomy table 215. Each link instance also identifies two node instances to which the link instance applies. For example, an entry in the link taxonomy table 215 may be of type "customer/vendor", and one or more instances of the "customer/vendor" link may be captured in the links table 220 by defining two nodes (e.g., nodes that define a company and an individual) to which the customer/vendor relationship applies.

The source table 225 may be used to define some context of where data comes from by storing information about the source of the data contained in the nodes table 210 and the links table 220. The source information indicates from where the node or link data originates (e.g., a news article, a background check, an interview of an individual, and the like). Thus, each entry in the source table 225 captures a particular information source and may be referenced by one or more nodes and/or links in the nodes table 210 and/or the links table 220. The date and time table 230 may be used to store temporal, information in the domain, such as an event date and time, a beginning date, and/or an ending date. The temporal information may include a date (e.g., Jun. 3, 1998) and/or a time (e.g., 12:35 p.m.). In addition, the temporal information may be absolute (e.g., Jan. 2, 2001), or the temporal information may be relative (e.g., tomorrow or March 3) with respect to other temporal information (e.g., 2004). Thus, each entry in the date and time table 230 captures a particular date and/or time and may be referenced by one or more link instances in the links table 220 and/or source instances in the source table 225.

As compared to traditional relational database models, the multi-table model 200 is less efficient in terms of data storage. In other words, the multi-table model 200 generally requires more storage space than traditional relational database models. In addition, the multi-table model 200 may be less efficient in terms of data access. However, the multi-table model 200 provides a very flexible mechanism for entering new data without requiring changes to the data storage schema (e.g., without requiring a definition of new database tables or data entry fields) and provides optimal storage of data for use in link analysis. For example, the knowledge domain can be modified to add new entities or attributes (i.e., as new nodes) or new relationships (i.e., as new links) without affecting the structure of the multi-table model 200 or the existing data in the multi-table database. Instead, new data can be included by merely adding new entries in the node taxonomy table 205 and/or link taxonomy table 215 and instantiating the new entries in the nodes table 210 and/or links table 220.

In some implementations, each of the tables 205-230 in the multi-table model 200 may include certain fields. For example, each of the tables may include an identifier (ID) field, which may contain a sequence number used for purposes of the multi-table model 200. The node taxonomy table 205 may include a type field for defining a generic node type (e.g., telephone number) and a value field containing a generic node value (e.g., 555-1234) corresponding to the generic node type. The node table 210 may include a node foreign key (FK) field, which stores a pointer 235 to an entry in the node taxonomy table 205 (e.g., instead of storing actual type and value information); a source foreign key field, which stores a pointer 240 to an entry in the source table 225; and a source position field for storing information about a location (e.g., a page and line number of a news article) in the source from which the node data is obtained.

The link taxonomy table 215 may include a type field for defining a generic link type (e.g., indicating ownership); a reflection field containing information about different properties and/or functions associated with each direction of the link; and a temporal flag field for indicating whether the generic link has a temporal aspect (e.g., true or false that the relationship represented by the link has an associated event date or a begin date and an end date).

The links table 220 may include a link foreign key (FK) field, that stores a pointer 245 to an entry in the link taxonomy table 215, and first and second node foreign key fields for storing pointers 250 to the two nodes to which the link applies. In some cases, which node is listed first and which is listed second may be important for identifying properties and/or functions of the link that depend on the link direction (i.e., when reflective links are used). The links table 220 may also include an event date and time foreign key field for storing a pointer 255 to an entry in the date and time table 230, that identifies a specific event date and/or time associated with the link; start and end date and time foreign key fields for storing pointers 260 and 265 to entries in the date and time table 230, that respectively identify specific start and end dates and/or times associated with the link; a source foreign key field, that stores a pointer 270 to an entry in the source table 225; and a source position field for storing information about a location in the source from which the link data is obtained. Other fields may include a uniqueness field for identifying whether a relationship or link is unique (i.e., one and only one such link can exist for a given node), a location field for storing geographical information associated with the link, a strength field for providing some concept of importance of link or event data (e.g., a report in the Wall Street Journal may be considered stronger than a tip from a ten year old child), a priority field for storing information about a significance of a link relative to other links, and a security class field for identifying a level of security clearance necessary to access the link data.

The source table 225 may include a source field, a title field, a name field, a category field, a class field, and a type field that define the source of data at varying levels of abstraction. For example, the source field might indicate that the data is derived from a newspaper, while the title, name, category, class, and type fields may include more specific information identifying the newspaper and indicating details about a news article that contains the data. In combination, the source, title, name, category, class, and type fields may uniquely identify the source. A size field may store information regarding the size of the source (e.g., the size of a news story), which may be important when analyzing text or other content. A text field may contain the text of the source, such as the body of a news story. Alternatively, the source table 225 may include a content field for storing not only text but also other types of content, such as voice recordings. The source table may also include a date and time foreign key field, for storing a pointer 275 to an entry in the date and time table 230 indicating temporal information associated with the source.

The date and time table 230 may include fields for identifying year, month, day, hour, minute, second, centisecond, or any other temporal information. The source table 225 and the date and time table 230 represent examples of tables that may be used for storing additional information about the node instances and link instances. The multi-table model may include other types of tables, such as a location table for storing location information about a node and/or a link. Other types of tables may be used for storing other types of information. In general, such additional information tables may be domain specific (i.e., the type of table may depend on the knowledge contained in the domain and/or the intended purpose of the link analysis).

In some implementations, and for some node and link types, it may be desirable to prevent duplication of generic node entries, node instances, generic link entries, and/or link instances by checking for uniqueness. To support the uniqueness check, it may be desirable to define a hierarchy of nodes and/or links. For example, different nodes may be used to define different types of objects or entities with varying degrees of specificity. For example, a node of type "car" may be more specific than a node of type "passenger vehicle," although the different nodes could be applied to the same vehicle. In such a case, a hierarchy may be used to define the node type "passenger vehicle" as encompassing the node type "car" (along with other more specific types of passenger vehicles, such as a van and/or a bus). Similarly, the node type "car" may encompass more specific types of cars, such as sports cars and sedans. The hierarchy may be used to prevent the same object or entity from being represented by multiple nodes of different types (e.g., to prevent a single car from being entered in the nodes table 210 as both a node with type "car" and a node with type "passenger vehicle"). The hierarchy might also be used to discover previously unknown associations by identifying different nodes in the nodes table 210 that could represent the same object or entity. Similar hierarchy designs for maintaining uniqueness might also be implemented in connection with links.

Figure 3:
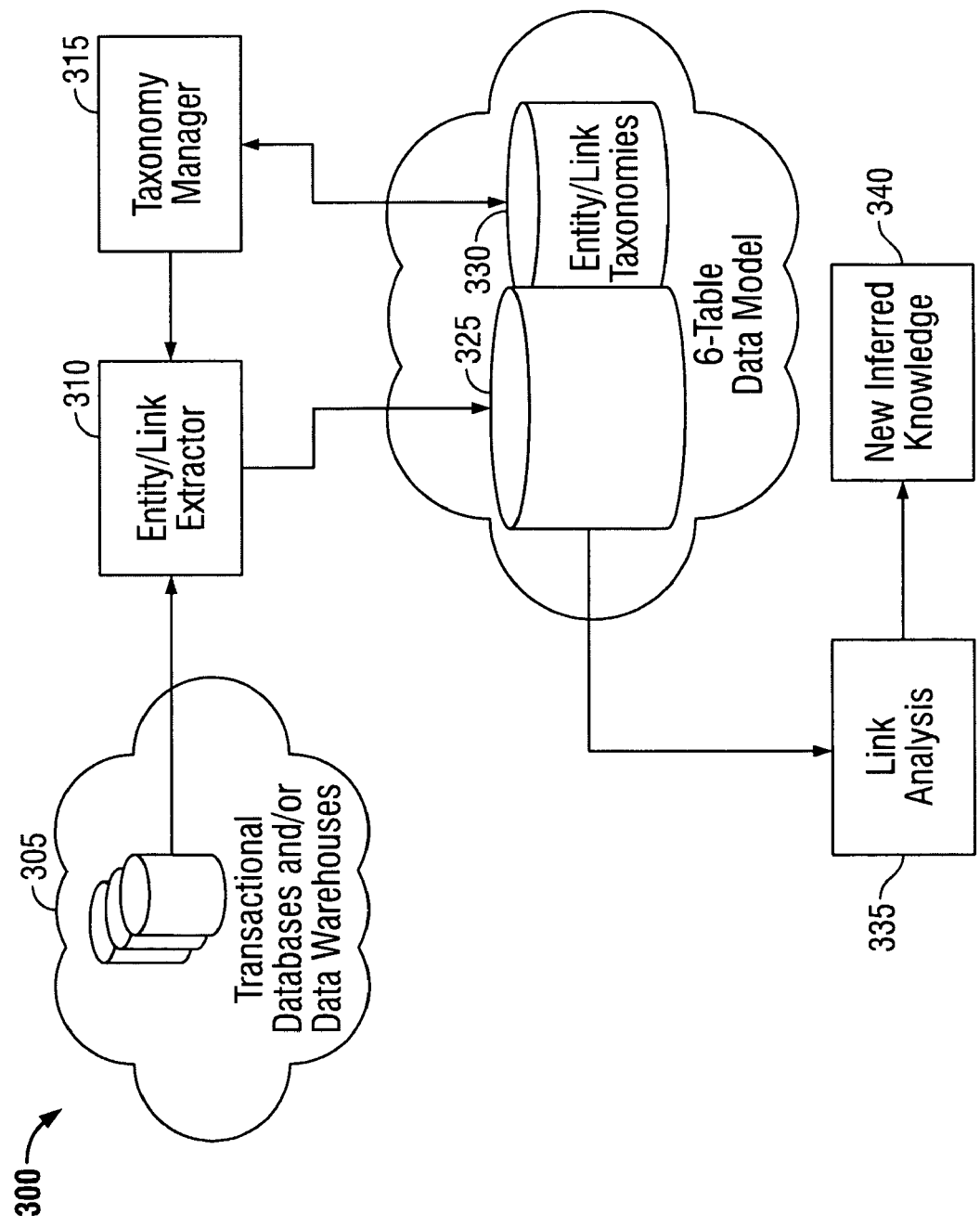
FIG. 3 is a block diagram of a link analysis system.

FIG. 3 is a block diagram of a link analysis system 300. The link analysis system 300 includes a data source 305, an entity/link extractor 310, a taxonomy manager 315, a multi-table database 325 that includes the entity/link taxonomies 330, a link analysis module 335, and a new inferred knowledge block 340. The data source 305 is the knowledge domain from which the data for performing link analysis, and for populating the multi-table model 200 of FIG. 2, is obtained. The data source 305 may include any number of different sources of data. Initially, the data may be partially consolidated, through manual or electronic entry, in transactional databases, data warehouses, and/or other data storage media.

The taxonomy manager 315 is a utility for managing the node and link taxonomies 330 and storing these taxonomies 330 in the multi-table database 325. The taxonomy manager 315 provides a set of tools for operating on the node and link taxonomies. In addition, the taxonomy manager 315 implements a set of rules that govern the construction of the multi-table database 325. For example, the taxonomy manager 315 offers capabilities such as detecting uniqueness of taxonomy entries, maintaining a list of current taxonomy entries, and linking to the instances that are based on the taxonomy entries. Taxonomy entries are generally unique in that no two generic node entries in the node taxonomy table 205 and no two generic link entries in the link taxonomy table 215 may be identical. Thus, the taxonomy manager 315 ensures that duplicative generic node entries and generic link entries are not created. When a generic node or link entry corresponding to new data does not already exist, however, the taxonomy manager 315 can create a new generic node or link entry. The taxonomy manager 315 may also provide other services, such as deleting or modifying generic node or link entries.

The entity/link extractor 310 is a utility for extracting information from the data source is 305 to identify entity pairs that are related to one another through a link, along with any information regarding the link. The entity/link extractor 310 performs a type of extract, transform, and load (ETL) operation for purposes of populating the multi-table database 325. The entity/link extractor 310 uses information from the taxonomy manager 315 to organize the extracted information and to populate the multi-table database 325. For example, the taxonomy manager 315 may provide information about existing generic node and/or link entries. In addition, the taxonomy manager 315 may provide information regarding unique link instances to prevent node and link instances from being duplicated when only one link of a particular type is allowed for a given node. Generally, the entity/link extractor 310 may be application-specific, in that the extraction, transformation, and loading functions are specifically tailored to the type of link analysis to be performed.

The multi-table database 325 stores the information provided by the entity/link extractor 310 in accordance with the multi-table model 200 of FIG. 2. The link analysis module 335 analyzes the data in the multi-table database 325. The link analysis module 335 may include predefined queries and other search tools that facilitate rapid searches through the domain knowledge by traversing node-to-node using the links. For example, the link analysis module 335 may support a search for nodes that fit selected criteria and that are located within a certain number of links of one another. The link analysis module 335 may also support a search through certain types of links (e.g., financial transactions) to identify entities that may be related. Accordingly, the link analysis module 335 generates new knowledge inferred from the data in the multi-table database 325 at the new inferred knowledge block 340.

As an example of the process of inferring new knowledge that may be performed by the link analysis module, the multi-table database 325 may store node instances representing a number of individuals, a number of bank accounts, and a number of residential addresses. The multi-table database 325 may also store link instances linking the individuals to deposits to and/or withdrawals from certain bank accounts and linking the individuals to certain residential addresses.

One of the individuals may be known to have ties to terrorism. The link instances may indicate that this individual has made deposits to a bank account and that another individual has made withdrawals from the same bank account. The second individual and a third individual may also be linked to a particular residential address. By traversing the links, it may be determined that the third individual might have ties to terrorism as a result of his shared residence with an individual who has made withdrawals from a bank account to which deposits were made by an individual with known ties to terrorism. The potential link between the third individual and terrorism activities may represent new knowledge that is inferred from the multi-table database 325.

The multi-table database 325 provides a data structure that optimally sets up the data in the knowledge domain for link analysis. In conventional link analysis that uses traditional databases, a tremendous amount of work must be put into developing the queries and the analysis tools for each specific link analysis application. Furthermore, the addition of new types of data to traditional databases can take months because it requires a modification of the underlying data structures. The multi-table model 200 is laid out in a way that does not require custom queries and search tools to be written for every link analysis application. The multi-table model 200 is also more responsive to new data because the underlying databases do not have to be changed and the multi-table model 200 provides a flexible way for new data to be easily incorporated into the multi-table database 325 without requiring changes to the modeling schema.

The link analysis system 300 and the techniques associated with the multi-table model 200 can be used for a variety of applications. For example, the systems and techniques may be used to enhance business intelligence and knowledge management capabilities. In addition, the systems and techniques can be used to develop a wide range of investigative applications, such as anti-terrorism research, fraud detection, law enforcement investigations, employee background checks, chat room monitoring, competitive analysis, profiling of individuals, companies, and organizations, patent analysis, investment analysis, transportation route optimization, manufacturing process planning, defect root-cause analysis, and intellectual capital harvesting.

Various implementations of the systems and techniques described here can be realized in digital electronic circuitry, integrated circuitry, specially designed ASICs (application specific integrated circuits), computer hardware, firmware, software, and/or combinations thereof. These various implementations can include one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) may include machine instructions for a programmable processor, and can be implemented in a high-level procedural and/or object-oriented programming language, and/or in assembly/machine language. As used herein, the term "machine-readable medium" refers to any apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

For example, the link analysis system 300 may be implemented in a computer system that includes software executable on a programmable processor. The data source 305 may be implemented in one or more data storage mediums. The entity/link extractor 310 and the taxonomy manager 315 may be implemented as software that may be executed on a computer or other processor. The entity/link extractor and taxonomy manager software may operate to store the multi-table database 325 on a data storage medium or mediums. In addition, the taxonomy manager 315 may provide users with the ability to access tools through a user interface to perform management operations on the data in the multi-table database 325. The link analysis module 335 may also be implemented as software that operates on the data stored in the multi-table database 325 and that supports a user interface through which users can execute queries or use other search tools. The new inferred knowledge may be generated as output and displayed on a user interface, such as a display screen, or stored in a database.

Figure 4:
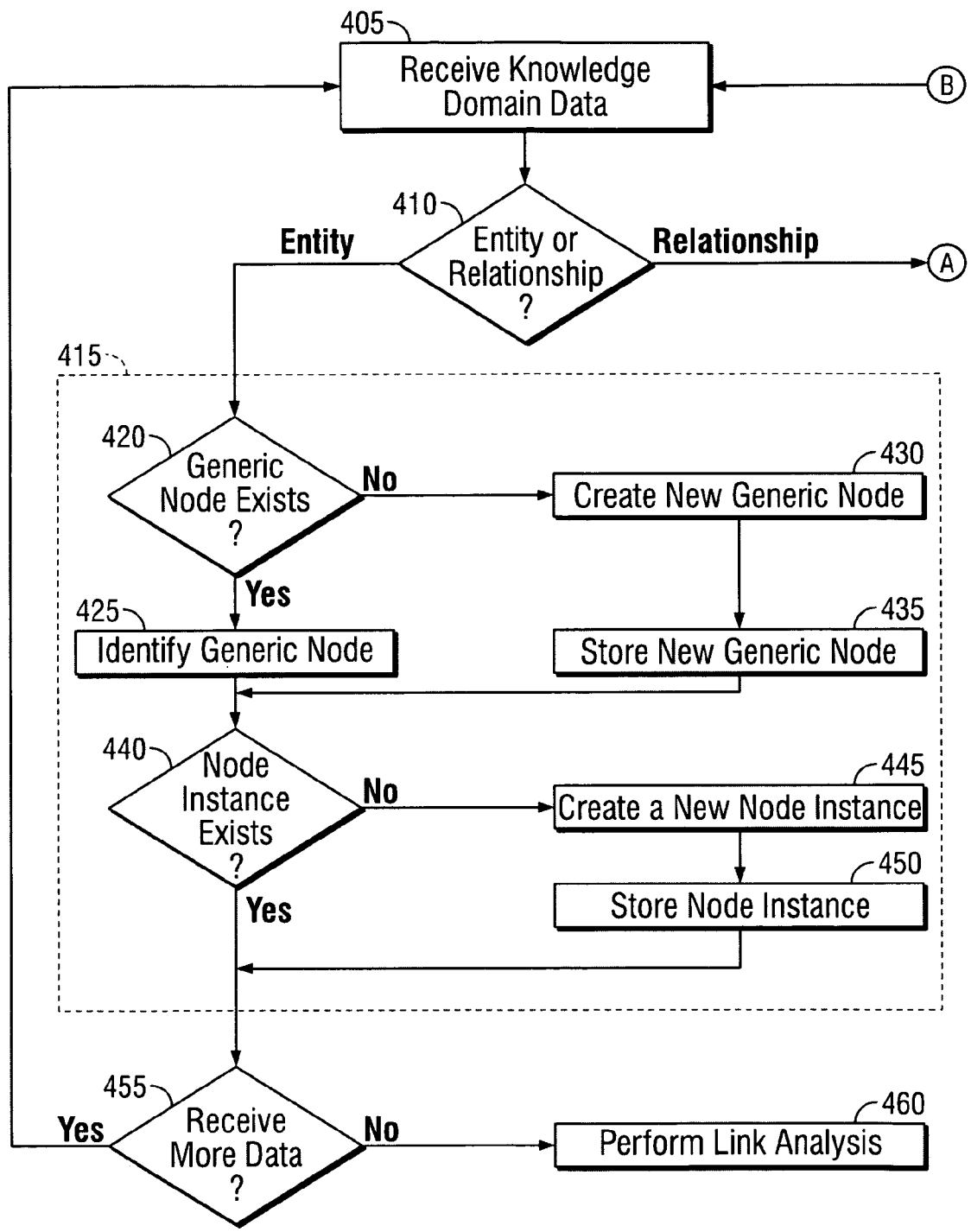
FIG. 4 is a flow diagram of a process for creating and storing data for use in link analysis.

FIG. 4 is a flow diagram of a process 400 for creating and storing data for use in link analysis. Initially, data for the knowledge domain is received (step 405). The knowledge domain data may be extracted or retrieved, for example, from a data source 305 by an entity/link extractor 310 (see FIG. 3). A determination is made as to whether the received data represents an entity or a relationship (step 410). In many cases, the received data may include both entity and relationship aspects, in which case parallel or sequential processing of the entity data and the relationship data may be performed. For relationship data, the process continues at step 505 (see FIG. 5), as discussed below. For entity data, the process continues with a node instance processing routine 415.

In the node instance processing routine, a determination is made as to whether a generic node that corresponds to the entity data already exists (step 420). This determination may be made by an entity/link extractor 310 in conjunction with a taxonomy manager 315 and/or by searching an entity/link taxonomies database 330 (see FIG. 3). If a generic node that corresponds to the entity data does already exist, the specific generic node is identified (step 425). If a generic node that corresponds to the entity data does not already exist, a new generic node is created (step 430) and the generic node is stored (step 435). For example, a taxonomy manager 315 may be used to create a generic node that corresponds to the entity data in an entity/link taxonomies database 330 for storage in a node taxonomy table 205.

A determination is next made as to whether a node instance that corresponds to the entity data already exists (step 440). For example, a node instance corresponding to the entity data may have been created based on previously received data. In some cases, a node instance that corresponds to the entity data may already exist, but the existing node instance may be based on a different generic node than that identified at step 425 or created at step 430. In such a case, the determination made at step 440 may involve checking a node hierarchy to determine if the entity could be represented by a node instance that is based on a different generic node. If a node instance that corresponds to the entity data does already exist, then it is not necessary to create a new node instance, and the node instance processing routine 415 is complete.

If a node instance that corresponds to the entity data does not already exist, a new node instance is created for the entity based on the generic node identified at step 425 or created at step 430 (step 445). The new node instance is then stored (step 450). The new node instance may be stored, for example, as an entry in a node table 210. The new node instance may also include a pointer to an entry in a source table 225 and a pointer to an entry in a date and time table 230. If necessary, new entries in the source table 225 and the date and time entry 230 may be created to store the source and temporal data for the entity data. Once the new node instance is stored, the node instance processing routine 415 is complete.

Upon completion of the node instance processing routine 415, a determination may be made of whether there is more knowledge domain data to be received (step 455). If so, the process returns to step 405 to receive more data. Otherwise, link analysis may be performed using stored node instances and stored link instances by traversing link-to-link through the stored node instances and stored link instances to infer new data regarding relationships among entities (step 460). The link analysis may be performed using a link analysis module 335.

Figure 5:
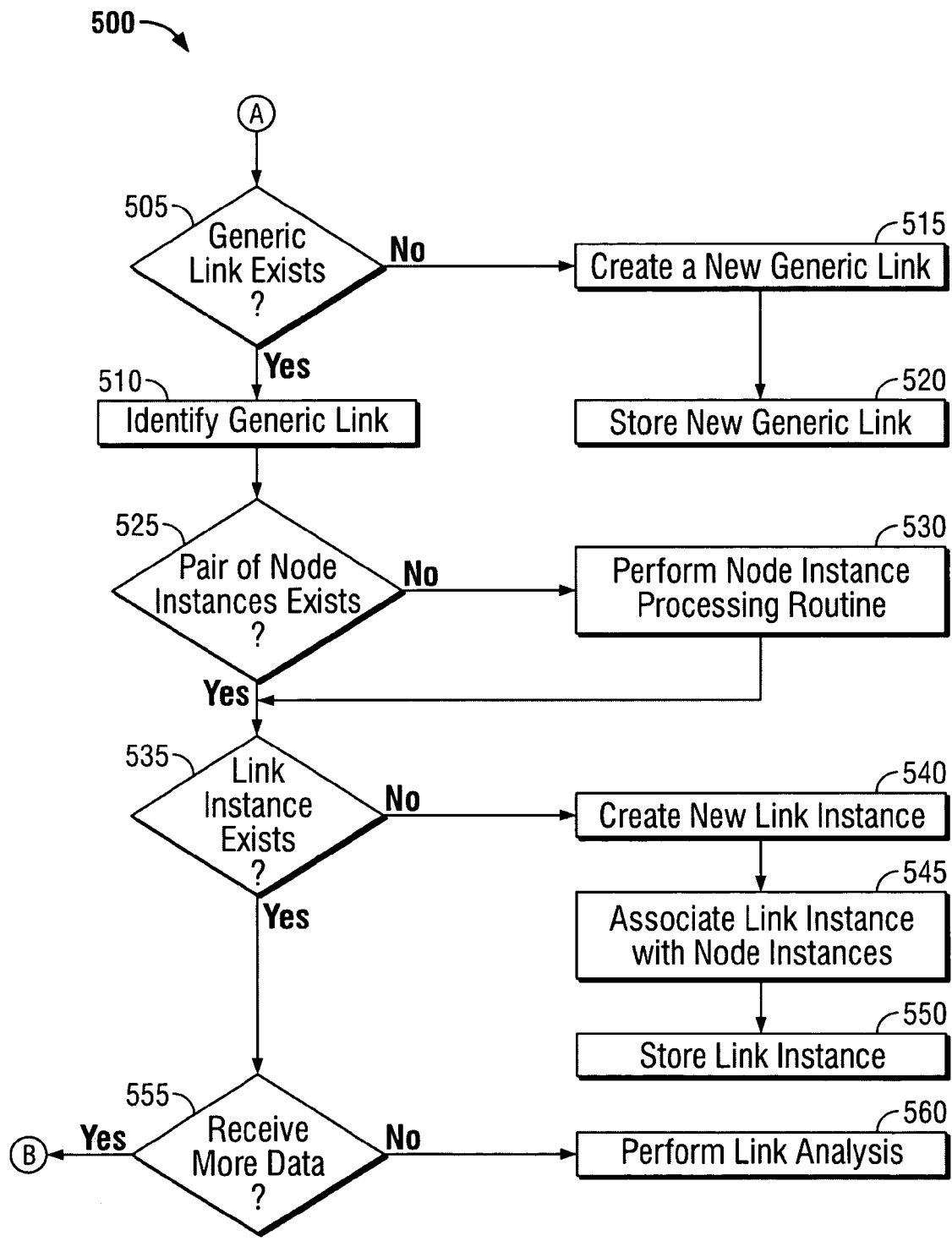
FIG. 5 is a flow diagram of a relationship-processing portion of the process for creating and storing data for use in link analysis shown in FIG. 4.

FIG. 5 is a flow diagram of a relationship-processing portion 500 of the process 400 for creating and storing data for use in link analysis shown in FIG. 4. Once it is determined that received knowledge domain data represents a relationship, a determination is made as to whether a generic link that corresponds to the relationship data already exists (step 505). This determination may be made by an entity/link extractor 310 in conjunction with a taxonomy manager 315 and/or by searching an entity/link taxonomies database 330. If a generic link that corresponds to the relationship data already exists, the specific generic link is identified (step 510). If a generic link that corresponds to the relationship data does not already exist, a new generic link is created (step 515) and the generic link is stored (step 520). For example, a taxonomy manager 315 may create a generic link that corresponds to the relationship data in an entity/link taxonomies database 330 for storage in a link taxonomy table 215.

A determination is next made as to whether a pair of node instances for the relationship already exists (step 525). In general, relationships exist between two or more entities, although relationships are typically represented between pairs of entities for purposes of link analysis. Thus, if a relationship involves more than two entities exists, multiple links will be created among specific pairs of the various entities. A relationship without a corresponding pair of entities may be essentially meaningless. Accordingly, a relationship that is used in the context of link analysis generally has a corresponding pair of entities or nodes to which the relationship applies. If the pair of node instances for the relationship does not already exist, the node instance processing routine 415 is performed for purposes of creating the node instances (step 530).

A determination is next made as to whether a link instance that corresponds to the relationship data already exists (step 535). For example, a link instance corresponding to the relationship data may have been created based on previously-received data. In some cases, a link instance that corresponds to the relationship data may already exist, but the existing link instance may be based on a different generic link than that identified at step 510 or created at step 515. In such a case, the determination made at step 535 may involve checking a link hierarchy to determine if the relationship could be represented by a link instance that is based on a different generic link. If a link instance that corresponds to the relationship data already exists, then it is not necessary to create a new link instance.

If a link instance that corresponds to the relationship data does not already exist, a new link instance is created for the relationship based on the generic link identified at step 510 or created at step 515 (step 540). The link instance is associated with the node instances to which the relationship applies (step 545), and the new link instance is then stored (step 550). The new link instance may be stored, for example, as an entry in a link table 220. The new link instance may also include a pointer to an entry in a source table 225 and one or more pointers to entries in a date and time table 230. If necessary, new entries in the source table 225 and the date and time table 230 may be created to store the source and temporal data for the relationship data. Once the new link instance is stored, a determination may be made of whether there is more knowledge domain data to be received (step 555). If so, the process returns to step 405 to receive more data. Otherwise, link analysis may be performed using stored node instances and stored link instances by traversing link-to-link through the stored node instances and stored link instances to infer new data regarding relationships among entities (step 560). The link analysis may be performed using a link analysis module 335.

A number of implementations have been described. Nevertheless, it will be understood that various modifications may be made. For example, a different number of tables other than that depicted may be used and the node and link tables may include additional or different types of data fields. In one possible implementation, the node and/or link tables may include source and/or temporal data instead of using separate source and date and time tables. In addition, the logic flows depicted in FIGS. 4 and 5 do not require the particular order shown, or sequential order, to achieve desirable results. Accordingly, other implementations are within the scope of the following claims.

What is claimed is:

1. A system for facilitating link analysis, the system comprising:
   at least one computer storage device comprising a database adapted to store data regarding a knowledge domain, the data including:
   generic nodes, with each generic node defining properties of a node that can be instantiated in the knowledge domain;
   node instances, with each node instance corresponding to one of the generic nodes and representing an entity in the knowledge domain;
   generic links, with each generic link defining at least one of properties and functions of a link that can be instantiated in the knowledge domain; and
   link instances, with each link instance corresponding to one of the generic links and representing a relationship between specified node instances; and
   a taxonomy management utility adapted to automatically manage the data stored in the database of the computer storage device, wherein the taxonomy management utility includes a set of instructions that govern a construction of the generic nodes and the node instances and the generic links and link instances by:
   maintaining uniqueness of the generic nodes and the generic links stored in the database;
   defining at least one hierarchy of generic nodes for use in maintaining uniqueness of node instances stored in the database, wherein different levels of the at least one hierarchy of generic nodes represent entities with different degrees of specificity;
   maintaining the uniqueness of the node instances by checking the hierarchy of generic nodes to determine if potential node instance data is already represented by a node instance based on a different generic node;

instantiating a new node instance representing the potential node instance data based on a determination that another node instance corresponding to the same potential node instance data is not already stored in the database; and storing the new node instance representing the potential node instance data in the computer storage device.

2. The system of claim 1 wherein the at least one database comprises:

a node taxonomy table for storing the generic nodes;
a node table for storing the node instances;
a link taxonomy table for storing the generic links; and
a link table for storing the link instances.

3. The system of claim 2 wherein each node instance includes a pointer to the corresponding generic node and each link instance includes a pointer to the corresponding generic link.

4. The system of claim 3 further comprising at least one of:

a source table for storing data source information, with each node instance and each link instance including a pointer to an entry in the source table;
a temporal table for storing temporal information, with each node instance and each link instance including a pointer to an entry in the temporal table; and
a location table for storing location information, with each node instance including a pointer to an entry in the location table.

5. The system of claim 1 further comprising an extraction utility for extracting node and link data from a data source and storing the node and link data in the at least one database.

6. The system of claim 1 further comprising a link analysis module for analyzing the node instances and the link instances in the at least one database to infer new knowledge.

7. The system of claim 6 wherein the link analysis module includes search tools for searching through the knowledge domain.

8. The system of claim 1 wherein each entity comprises one of a person, an enterprise, an object, an attribute, a characteristic, and a property.

9. An article comprising a computer storage device storing instructions operable to cause one or more machines to automatically perform operations comprising:

receiving data relating to a plurality of entities;
identifying, for each entity, a generic node from a collection of generic nodes stored in the computer storage device having properties that correspond to the entity, wherein a construction of the collection of generic nodes is governed by a set of rules for maintaining uniqueness of the generic nodes;
determining whether a node instance corresponding to a particular entity has previously been stored in the computer storage device for each particular entity in accordance with a generic node hierarchy stored in the computer storage device, wherein different levels of the generic node hierarchy represent entities with different degrees of specificity;
if a node instance does not already exist for a particular entity:
creating a node instance corresponding to the identified generic node for the particular entity;
storing the node instance corresponding to the identified generic node for the particular entity in the computer storage device;
receiving data relating to a relationship between entities;
identifying a generic link from a collection of generic links stored in the computer storage device having at least one of properties and functions that correspond to the relationship;
creating a link instance corresponding to the identified generic link; and
associating the link instance with a pair of the node instances.

10. The article of claim 9 wherein the computer storage device stores instructions operable to cause one or more machines to perform further operations comprising:

determining that the collection of generic nodes does not include a generic node for a particular entity;
generating a new generic node having properties that correspond to the particular entity; and
creating a node instance from the new generic node for the particular entity.

11. The article of claim 9 wherein the computer storage device stores instructions operable to cause one or more machines to perform further operations comprising:

determining that the collection of generic links does not include a generic link for a particular relationship;
generating a new generic link having at least one of properties and functions that correspond to the particular relationship; and
creating a link instance from the new generic link for the particular relationship.

12. The article of claim 9 wherein the computer storage device stores instructions operable to cause one or more machines to perform further operations comprising:

storing the node instances as entries in a node table; and
storing the link instance as an entry in a link table.

13. The article of claim 9 herein the link instance entry includes a pointer to each of the node instance entries for the associated pair of node instances.

14. The article of claim 9 wherein each node instance entry includes a pointer to the corresponding generic node and the link instance entry includes a pointer to the corresponding generic link.

15. The article of claim 9 wherein each node instance entry includes at least one of a pointer to an entry in a source table, a pointer to an entry in a temporal table, and a pointer to an entry in a location table and the link instance entry includes a pointer to an entry in the source table, with each entry in the source table defining a source of the instance data, each entry in the temporal table defining temporal data associated with the instance, and each entry in the location table defining location data associated with the instance.

16. The article of claim 9 wherein the link table includes entries for link instances, the node instances and the link instances form a knowledge domain, and the computer storage device stores instructions operable to cause one or more machines to perform further operations comprising searching the knowledge domain by traversing link by link through the node instances and the link instances to infer new data regarding relationships among entities.

17. A method for generating a data structure for use in link analysis, the method comprising:

receiving data relating to a relationship between a pair of entities;
identifying a generic link from a collection of generic links defined in a database stored in a computer storage device, the identified generic link having at least one of properties and functions that correspond to the relationship, wherein a construction of the collection of generic links is governed by a set of rules for maintaining uniqueness of the generic links stored in the computer storage device;

determining whether a link instance is already defined in the database for a particular relationship in accordance with a link hierarchy, wherein different levels of the link hierarchy represent relationships with different degrees of specificity;

if a link instance does not already exist for a particular relationship:

storing data defining a link instance corresponding to the identified generic link for the particular relationship in the computer storage device;

determining whether node instances representing the pair of entities exist in the database;

if a node instance representing at least one of the entities from the pair of entities does not exist:

identifying a generic node from a collection of generic nodes defined in the database, the identified generic node having properties that correspond to the at least one of the entities; and creating a node instance corresponding to the identified generic node for the at least one of the entities; and storing, in the computer storage device, an association between the link instance and the node instances that represent the pair of entities.

18. The method of claim 17 further comprising:
storing the link instance in a link table; and
storing the node instances in a node table, wherein associating the link instance with the node instances comprises storing pointers in the link instance that point to the stored node instances.

19. The method of claim 17 further comprising at least one of:
storing data source information in a source table, with at least one of the link instance and the node instances including a pointer to an entry in the source table;
storing temporal information in a temporal table, with at least one of the link instance and the node instances including a pointer to an entry in the temporal table; and
storing location information in a location table, with at least one of the link instance and the node instances including a point to an entry in the location table.

20. The method of claim 17 further comprising analyzing the node instances and the link instances to infer new knowledge.

21. A system for facilitating link analysis, the system comprising:
a taxonomy management utility adapted to automatically manage data stored in at least one computer storage device, the at least one computer storage device comprising a database adapted to store data defining a knowledge domain, the data including:
generic nodes, with each generic node defining properties of a node that can be instantiated in the knowledge domain;
node instances, with each node instance corresponding to one of the generic nodes and representing an entity in the knowledge domain;
generic links, with each generic link defining at least one of properties and functions of a link that can be instantiated in the knowledge domain; and
link instances, with each link instance corresponding to one of the generic links and representing a relationship between specified node instances,
wherein the taxonomy management utility includes a set of instructions that govern a construction of the generic nodes and the node instances and the generic links and the link instances by:
maintaining uniqueness of the generic nodes and the generic links stored in the database;
defining at least one hierarchy of generic nodes for use in maintaining uniqueness of node instances stored in the database, wherein different levels of the at least one hierarchy of generic nodes represent entities with different degrees of specificity;
maintaining the uniqueness of the node instances by checking the hierarchy of generic nodes to determine if potential node instance data is already represented by a node instance based on a different generic node;
instantiating a new node instance representing the potential node instance data based on a determination that another node instance corresponding to the same potential node instance data is not already stored in the database; and
storing the new node instance representing the potential node instance data in the computer storage device.

22. The system of claim 21 wherein the data further includes at least one of:
data source information, with at least one of a node instance and a link instance including a pointer to the data source information;
temporal information, with at least one of a node instance and a link instance including a pointer to the temporal information; and
location information, with at least one of a node instance and a link instance including a pointer to the location information.

23. The system of claim 21 wherein each link instance includes pointers to the specified node instances, each link instance includes a pointer to the corresponding generic link, and each node instance including a pointer to the corresponding generic node.

* * * * *

UNITED STATES PATENT AND TRADEMARK OFFICE
CERTIFICATE OF CORRECTION

PATENT NO. : 7,580,947 B2 Page 1 of 1
APPLICATION NO. : 10/401104
DATED : August 25, 2009
INVENTOR(S) : Kas Kasravi et al.

It is certified that error appears in the above-identified patent and that said Letters Patent is hereby corrected as shown below:

In column 14, line 34, in Claim 13, delete "herein" and insert -- wherein --, therefor.

Signed and Sealed this

Thirtieth Day of March, 2010

David J. Kappos
*Director of the United States Patent and Trademark Office*